US009294208B2

(12) United States Patent
Kallio et al.

(10) Patent No.: US 9,294,208 B2
(45) Date of Patent: Mar. 22, 2016

(54) METHOD AND SYSTEM TO SIGNAL NETWORK INFORMATION IN TPS BITS

(75) Inventors: Jarno Kallio, Nilsia (FI); Jani Vare, Kaarina (FI); Kari S. Virtanen, Merimasku (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 2122 days.

(21) Appl. No.: 11/681,524

(22) Filed: Mar. 2, 2007

(65) Prior Publication Data

US 2008/0214102 A1 Sep. 4, 2008

(51) Int. Cl.
*H04B 1/10* (2006.01)
*H04H 20/95* (2008.01)
*H04H 20/28* (2008.01)

(52) U.S. Cl.
CPC ............... *H04H 20/95* (2013.01); *H04H 20/28* (2013.01)

(58) Field of Classification Search
USPC ............................ 370/312, 331, 328; 455/70
See application file for complete search history.

(56) References Cited

U.S. PATENT DOCUMENTS

| | | | | |
|---|---|---|---|---|
| 6,131,030 | A * | 10/2000 | Schon et al. | 455/438 |
| 2002/0080887 | A1* | 6/2002 | Jeong et al. | 375/295 |
| 2002/0166128 | A1* | 11/2002 | Ikeda et al. | 725/112 |
| 2005/0232223 | A1 | 10/2005 | Muller | |
| 2005/0233705 | A1* | 10/2005 | Vare et al. | 455/70 |
| 2006/0262744 | A1* | 11/2006 | Xu et al. | 370/328 |
| 2006/0262751 | A1* | 11/2006 | Vermola et al. | 370/331 |
| 2007/0064652 | A1* | 3/2007 | Xu et al. | 370/331 |
| 2007/0109262 | A1* | 5/2007 | Oshima et al. | 345/156 |

FOREIGN PATENT DOCUMENTS

| | | | |
|---|---|---|---|
| EP | 0 961 430 | A | 12/1999 |
| GB | 2399986 | A | 9/2004 |
| GB | 2406483 | A | 3/2005 |
| WO | 2004086656 | | 10/2004 |
| WO | 2005083918 | A1 | 9/2005 |
| WO | 2006/131797 | A | 12/2006 |

OTHER PUBLICATIONS

International Search Report for International Application No. PCT/IB2008/000260 dated May 29, 2009, 3 pages.
European Broadcasting Union, "Digital Video Broadcasting (DVB); Specification for Service Information (SI) in DVB Systems," May 2003, pp. 1-93, European Telecommunications Standards Institute, France.

(Continued)

*Primary Examiner* — Shahriar Behnamian
(74) *Attorney, Agent, or Firm* — Po-Wei Chen

(57) ABSTRACT

Embodiments are directed to defining hierarchical digital broadcast transport streams as separate cells, which reduces the signaling in OSI layer 1, and removing use of sub-cells so that the coverage area of a transposer may be treated as a cell. In accordance with at least one embodiment, each hierarchical DVB-H stream (i.e., the HP stream and the LP stream) has its own separate dedicated "current signal" frame. This allows the streams to be independent of each other (even to belong to different networks). Furthermore, in accordance with the hierarchical signal arrangement, a cell can be uniquely identified by its network_id and cell_id. In accordance with at least one embodiment, frequency may be used as an additional identifier thereby allowing a first cell to be transposed to a sub-cell.

35 Claims, 9 Drawing Sheets

(56) References Cited

OTHER PUBLICATIONS

Vare, J. et al. "Approach for improving receiver performance in loss-free handovers in DVB-H networks," Global Telecommunications Conference, 2004, pp. 3326-3331, vol. 5, IEEE Communications Society, US.

Hamara, Arto, Thesis: Considerations on Loss Free Handover in IPDC on DVB-H Networks, Feb. 1, 2005, pp. 1-58, US.

European Broadcasting Union, "Digital Video Broadcasting (DVB); Framing structure, channel coding and modulation for digital terrestrial television," Nov. 2004, pp. 1-64, European Telecommunications Standards Institute, France.

* cited by examiner

METHOD AND SYSTEM TO SIGNAL NETWORK INFORMATION IN TPS BITS

FIELD

The invention relates generally to communications networks. More specifically, the invention relates to parameter signaling in a communication network.

BACKGROUND

Digital broadband broadcast networks enable end users to receive digital content including video, audio, data, and so forth. Using a mobile terminal, a user may receive digital content over a wireless digital broadcast network. Digital content can be transmitted in a cell within a network. A cell may represent a geographical area that may be covered by a transmitter in a communication network. A network may have multiple cells, and cells may be adjacent to other cells.

In the past, access from one cell to signals being transmitted in a neighboring cell has been challenging. When information of signals in a neighboring cell is desired, such access may be difficult to obtain without a large expenditure of time and power. For example, access to signals in a neighboring cell via an interaction network wastes time as well as power of the receiver.

U.S. application Ser. No. 11/339,527, filed Jan. 26, 2006, addresses this issue by disclosing systems and methods for detecting neighboring cells in a communication network based on transmission parameter signal data, which is referred to in DVB as Transmission Parameter Signaling (TPS) bits, received in a signaling frame. In one example, a signaling frame contains a field of TPS bits that indicate a type of the signaling frame. The type of the signaling frame may indicate the information carried in the signaling frame as information of a current cell or a neighboring cell. The signaling frame may further include information from a neighboring cell in the same network or a different network as the current cell.

In digital broadcast networks, such as DVB-T/H systems, it is possible to transmit two MPEG-2 transport streams (TS) in one broadband channel that is identifiable by a channel center frequency when hierarchical mode is in use. The signal is divided into a High Priority (HP) stream and a Low Priority (LP) stream. The HP stream is more robust and thus extends the reception possibilities. The LP stream is less robust, but provides more capacity for service to use.

Furthermore, in digital broadcast networks, such as DVB-T/H, transposers or gap-fillers may be used to transpose a DVB-T/H stream from one transmitting frequency into another without re-modulating the DVB-T/H stream. Transposed sub-cells of this type provide an inexpensive way to extend the DVB-T/H network coverage. DVB-T/H is discussed in this document as an example of a digital broadcast network. But various features in accordance with embodiments may be used in other digital broadband broadcast systems such as Digital Video Broadcast-Terrestrial (DVB-T), Digital Video Broadcast-Handheld (DVB-H), Digital Multimedia Broadcast-Terrestrial (DMB-T), Terrestrial Digital Multimedia Broadcasting (T-DMB), Forward Link Only (FLO), and any other existing or later-developed digital broadcast systems both standardized and proprietary.

When hierarchical mode is used in DVB-T/H, the receiver must know, in addition to the identification for a network, network_id, and identification for a cell, cell_id, the priority of the DVB-T/H stream (i.e., whether it is HP or LP) in order to be able to receive the correct transport stream. Due to this type of signaling scheme, the vast majority of implementations are not able to support hierarchical transmission. Also, since the cell_id and network_id are shared attributes of the HP and LP streams, the streams are not independent of each other.

The network_id, cell_id, and other parameters of a sub-cell are the same as in the sub-cell's "mother cell" because the same signal is simply shifted into another frequency. Since none of the parameter values are changed in the "original stream," the original stream also has to contain the sub-cell parameters (including frequency) in a separate descriptor. Due to its signaling complexity, the sub-cells typically lack end-to-end support in DVB-T/H systems.

U.S. application Ser. No. 11/339,527 describes signaling DVB-H parameters within TPS bits. In that application, however, a relation of HP/LP streams and cell and sub-cells was adopted that is similar those relations as in present standard (ETSI EN 300 744 V1.5.1 (2004-11) Digital Video Broadcasting (DVB); Framing structure, channel coding and modulation for digital terrestrial television, downloadable at http://webapp.etsi.org/exchangefolder/en_300744v010501p.pdf) compliant DVB-H systems. In DVB-T/H systems, the signaling of hierarchical streams is done by means of additional parameters "priority" and "hierarchy" (in Terrestrial delivery system, these descriptors of the Network Information Table (NIT) are described in ETSI EN 300 468 V1.7.1 (2006-05) Digital Video Broadcasting (DVB); Specification for Service Information (SI) in DVB systems, downloadable at http://webapp.etsi.org/exchangefolder/en_300468v010701p.pdf). Further, the signaling of sub-cell(s) was done with an additional descriptor "cell frequency link descriptor" (in Terrestrial delivery system, this descriptor of the Network Information Table (NIT) is also described in ETSI EN 300 468).

As such, it would be an advancement in the art to address the limitations discussed above by more efficiently signaling network information in TPS bits.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Embodiments are directed to defining hierarchical digital broadcast transport streams as separate cells, which reduces the signaling in the physical layer known as OSI layer 1, and removing use of sub-cells so that the coverage area of a transposer may be treated as a cell. In accordance with at least one embodiment, each hierarchical DVB-T/H stream (i.e., the HP stream and the LP stream) has its own separate dedicated "current signal" frame. This allows the streams to be independent of each other (even to belong to different networks). Furthermore, in accordance with the hierarchical signal arrangement, a cell can be uniquely identified by its network_id and cell_id. In accordance with at least one embodiment, frequency may be used as an additional identifier thereby allowing a first cell to be transposed to a sub-cell.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As mentioned above, U.S. application Ser. No. 11/339,527 describes signaling DVB-T/H parameters within TPS bits. In that application and in DVB-T/H systems, the signaling of hierarchical streams and sub-cells is done by means of additional parameters and descriptors. According to current standards EN 300 744 and EN 300 468, there is no signaling of neighboring cells in OSI layer 1. Instead, signaling of neighboring cells occurs in data link layer, known as OSI layer 2. U.S. application Ser. No. 11/339,527 discloses signaling of current and neighboring cells in OSI layer 1 (also signaling of different networks, but does not provide signaling of sub-cells in OSI layer 1 and assumes that mapping between cell_id and service is done in OSI layer 2.

In accordance with one or more embodiments, hierarchical transport streams may be defined as separate cells, which reduces the signaling in OSI layer 1, and use of sub-cells is removed so that the coverage area of a transposer may be treated as a cell.

Figure 1:
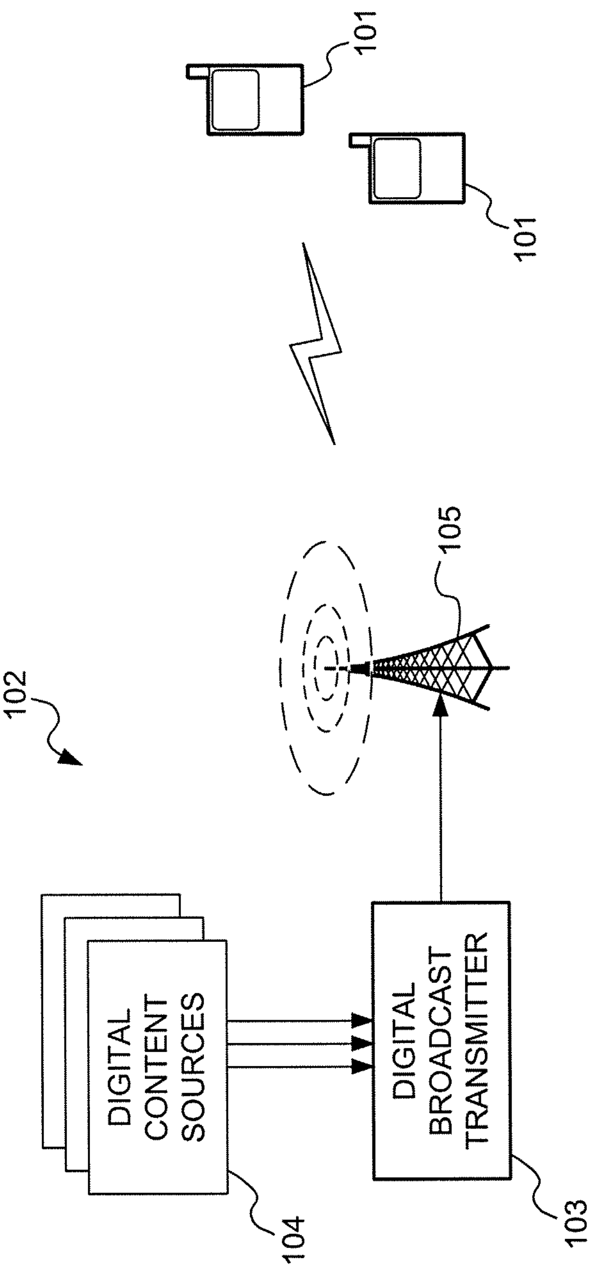
FIG. 1 illustrates a suitable digital broadband broadcast system in which one or more illustrative embodiments may be implemented.

FIG. 1 illustrates a suitable digital broadband broadcast system 102 in which one or more illustrative embodiments may be implemented. Systems such as the one illustrated here may utilize a digital broadband broadcast technology, for example Digital Video Broadcast-Handheld (DVB-H). Examples of other digital broadcast standards which digital broadband broadcast system 102 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Forward Link Only (FLO), Digital Audio Broadcasting (DAB), and Digital Radio Mondiale (DRM). Other digital broadcasting standards and techniques, now known or later developed, may also be used. An aspect of the invention is also applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast Multicast Services) and 3GPP2 BCMCS (Broadcast and Multicast Service).

Digital content may be created and/or provided by digital content sources 104 and may include video signals, audio signals, data, and so forth. Digital content sources 104 may provide content to digital broadcast transmitter 103 in the form of data packets, e.g., Internet Protocol (IP) packets. A group of related IP packets sharing a certain unique IP address or other source identifier is sometimes described as an IP stream. Digital broadcast transmitter 103 may receive, process, and forward for transmission multiple IP streams from multiple digital content sources 104. The processed digital content may then be passed to digital broadcast tower 105 (or other physical transmission component) for wireless transmission. Ultimately, mobile terminals 101 may selectively receive and consume digital content originating from digital content sources 104.

In an example of the DVB standard, one DVB 10 Mbit/s transmission may have 200 50-kbit/s audio program channels or 50 200-kbit/s video (TV) program channels. A mobile device may be configured to receive, decode, and process transmissions based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device may have one or more buffer memories for storing the decoded time sliced transmission before presentation.

Figure 2:
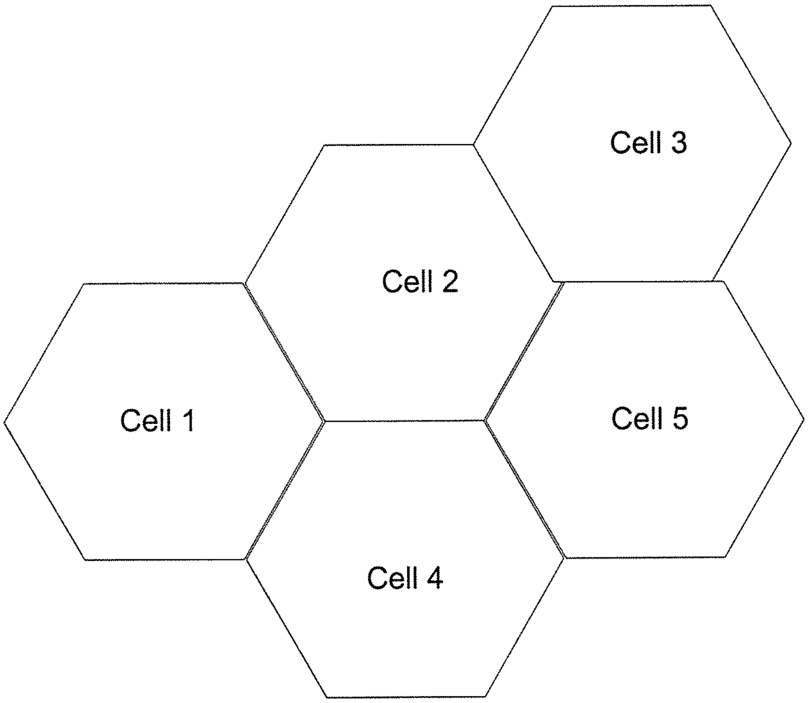
FIG. 2 illustrates an example of cells, each of which may be covered by a different transmitter in accordance with an aspect of the present invention.

In a typical communication system, a cell may define a geographical area that may be covered by a transmitter. The cell may be of any size and may have neighboring cells. FIG. 2 illustrates a schematic example of cells, each of which may be covered by a different transmitter. In this example, Cell 1 represents a geographical area that is covered by a transmitter for a communication network. Cell 2 is next to Cell 1 and represents a second geographical area that may be covered by a different transmitter. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

In one example, data transmission within one cell may be detected from a different cell. For example, if a receiver is within Cell 2 of FIG. 2, the receiver may also receive information regarding signals in Cells 1, 3, 4, and/or 5 in a rapid and efficient manner.

In one example, information pertaining to data transmission from a different cell or a neighboring cell may be provided in Transmission Parameter Signaling (TPS) bits within signaling frames. For example, Orthogonal Frequency Divisional Multiplexing (OFDM) frames containing TPS bits may be provided for providing information or parameters of a current signal or parameters for neighboring cells. The type of frame, parameters and information provided in the frame, and/or the order of the frames may indicate the type of contents or the bits within the frame.

Program Specific Information (PSI) (or Service Information (SI)) data provides information for enabling automatic configuration of a receiver to demultiplex and decode the various streams of programs within a digital broadcast multiplex signal. The PSI/SI data includes a Network Information Table (NIT), which provides information relating to the physical organization of the multiplexes, also known as TransportStreams (TS), carried via a given network. A receiver can store the NIT contents, to attempt to minimize access time when switching between channels. The PSI/SI data forms part of the data layer, or OSI layer 2, of the communication protocol stack.

A receiver, also known as an Integrated Receiver/Decoder (IRD) detects parameters of a prevailing signal and/or network by filtering and parsing a received PSI/SI table. From this information, an IRD can determine whether or not a signal is a valid handover candidate. However, since typically PSI/SI tables may be transmitted in any interval from 25 milliseconds to 10 seconds, depending on the table (e.g., maximum interval for NIT table is 10 seconds), and since the PSI/SI information is transmitted on a data layer (e.g., OSI level 2), signal scanning and handover processes can be expected to involve utilization of a significant amount of the processing, receiver and power resources of the IRD, as well as being time consuming. This is of particular importance as regards power consumption in battery-operated mobile handheld devices.

Figure 3:
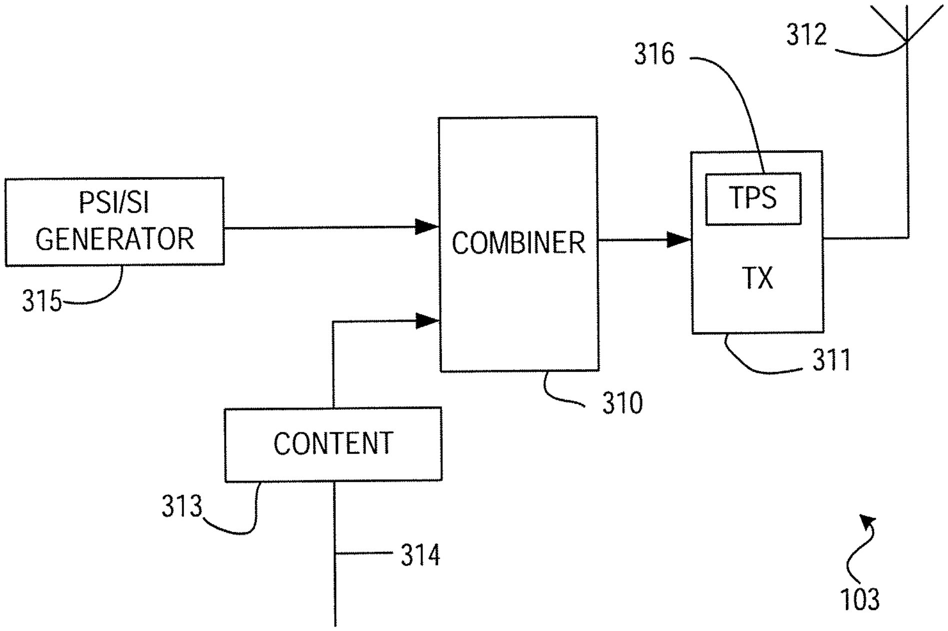
FIG. 3 illustrates a block schematic diagram of a transmitter that may be used with one or more illustrative aspects of the invention.

Referring to FIG. 3, a transmitter station 103 is shown in schematic form, comprising generally a data source in the form of a combiner 310, a transmitter 311 and an antenna 312. The combiner 310 receives input data from a content provider 313, which is connected via an input 314 to the digital content sources 104 shown in FIG. 1.

Also arranged to provide data to the combiner is a Program Specific Information (PSI) (or Service Information (SI)) data generator 315. The transmitter 311 includes a transmission parameter signaling (TPS) data generating device 316. The combiner 310 is arranged to source data from the content provider device 313 and the PSI/SI generator device 315 and to provide a data stream according to the DVB standards for inclusion with TPS data and subsequent transmission by the transmitter 311.

According to the DVB broadcasting standards, data provided by the TPS generator 316 is included in the physical layer of the transmitted signals many times a second, whereas the PSI/SI generating device 315 data is included in the data layer of the transmitted signal and much less frequently, with up to 10 second intervals between data transmissions. As is conventional the PSI/SI generator 315 generates data representing a network information table (NIT), which is in accordance with the DVB standards. The transmitter 311 can therefore be considered to include transmission parameter information provided by the TPS generator 316 with service information provided as part of the data generated by the PSI/SI generator 315. The resultant signal can be considered as a composite signal, and it is the composite signal which is then transmitted by the transmitter 311 by way of the antenna 312. Of course, the composite signal also includes content data provided by the content generator 313, and optionally other data which is outside the scope of this disclosure.

Digital broadcast transmitter 103 may transmit plural signals according to any one or more suitable digital broadcast standards. In this connection, the transmitter 103 may include one or more physical transmitters at a single location and sharing a common antenna. Each signal transmitted by a given one of the transmitters 103 may differ from other signals in terms of the frequency of the signal, the network type, the format of the transport stream, the network's topology, the transmitter power, and the nature of the multiplexing used. For example, multiplexing may be in a time-sliced nature, which is conceptually similar to time division multiplexing, or it may be that multiplexing is effected other than in the time domain. The types of transport stream which might be used will be known by those skilled in the art. The network type might be, for example, a DVB network or an Internet Protocol Data Cast (IPDC) network.

The topology of the network might be single frequency or multiple frequency. A multiple frequency network might have transmissions on plural contiguous frequency bands. The DVB standards allow for bandwidths of 5, 6, 7 and 8 MHz. For example, the implementation of DVB in Europe utilizes signals having a bandwidth of 8 MHz.

Figure 4:
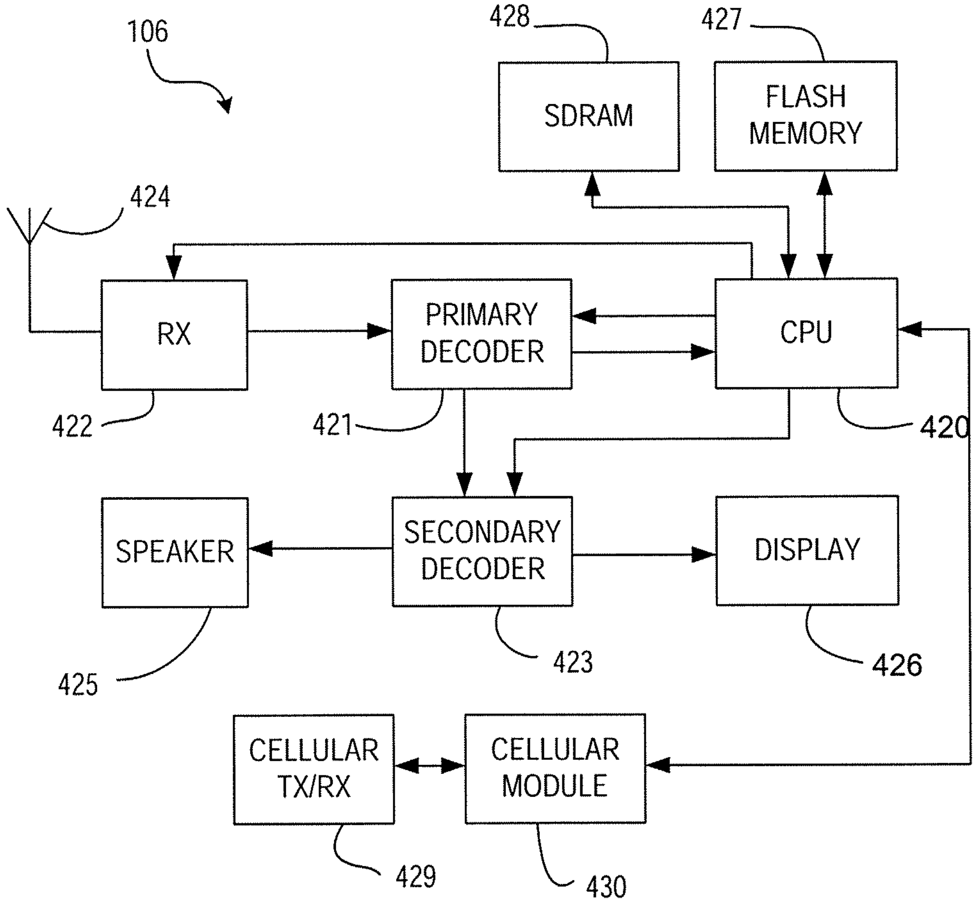
FIG. 4 illustrates a block schematic diagram of an integrated receiver/decoder (IRD) that may be used in conjunction with one or more illustrative aspects of the invention.

In accordance with one or more embodiments, a mobile terminal 101 may take the form of an Integrated Receiver/Decoder IRD 106, which will now be described with reference to FIG. 4. Referring to FIG. 4, the IRD 106 is shown schematically, comprising generally a central processing unit (CPU) 420, which is connected to control each of a primary decoder 421, a receiver 422, a secondary decoder, e.g. an MPEG-2 and IP (Internet Protocol) decoder 423, to a non-volatile flash memory 427, and to a volatile memory 428, e.g., SDRAM.

The receiver 422 is connected to receive radio frequency signals via an antenna 424, and to provide demodulated signals to the decoder 421. The primary decoder 421 is arranged under control of the CPU 420 to provide decoded data both to the CPU and to provide MPEG or IP data to the secondary decoder 423. The secondary decoder 423 provides audio outputs to a speaker 425 and visual outputs to a display 426, whereby audiovisual content present in the signal received at the receiver 422 can be presented to a user. Although in this example IP and MPEG signals are able to be processed by a common decoder 423, it will be appreciated that separate decoders could be used instead.

The flash memory 427 is used to store data parsed from an NIT during signal scan. The volatile memory 428 is used to store some of the data used in earlier stages of a handover procedure.

In this embodiment, the IRD 106 also includes a transceiver 429 for allowing communication in a mobile telephone system, such as e.g., GSM, GPRS, 3G, UMTS for example, which is coupled to a corresponding mobile telephone and data handling module 430. The transceiver 429 and the module 430 allow the IRD 106 to operate as a telephone and mobile Internet portal, as well as to allow the user of the IRD to subscribe to services of interest which are communicated by data cast using the digital broadcast network. This can be achieved in any convenient manner. For example, the user might send a request for service delivery to a mobile telephone operator with which the user subscribes using the UMTS components 429, 430. The operator may then arrange for the service to be provided via digital broadcast using an Internet service provider. Notifications of service delivery may be communicated to the IRD using the UMTS system or the digital broadcast system. The IRD 106 may be configured to detect network information forming part of the TPS data, and to utilize that data appropriately.

Figure 5:
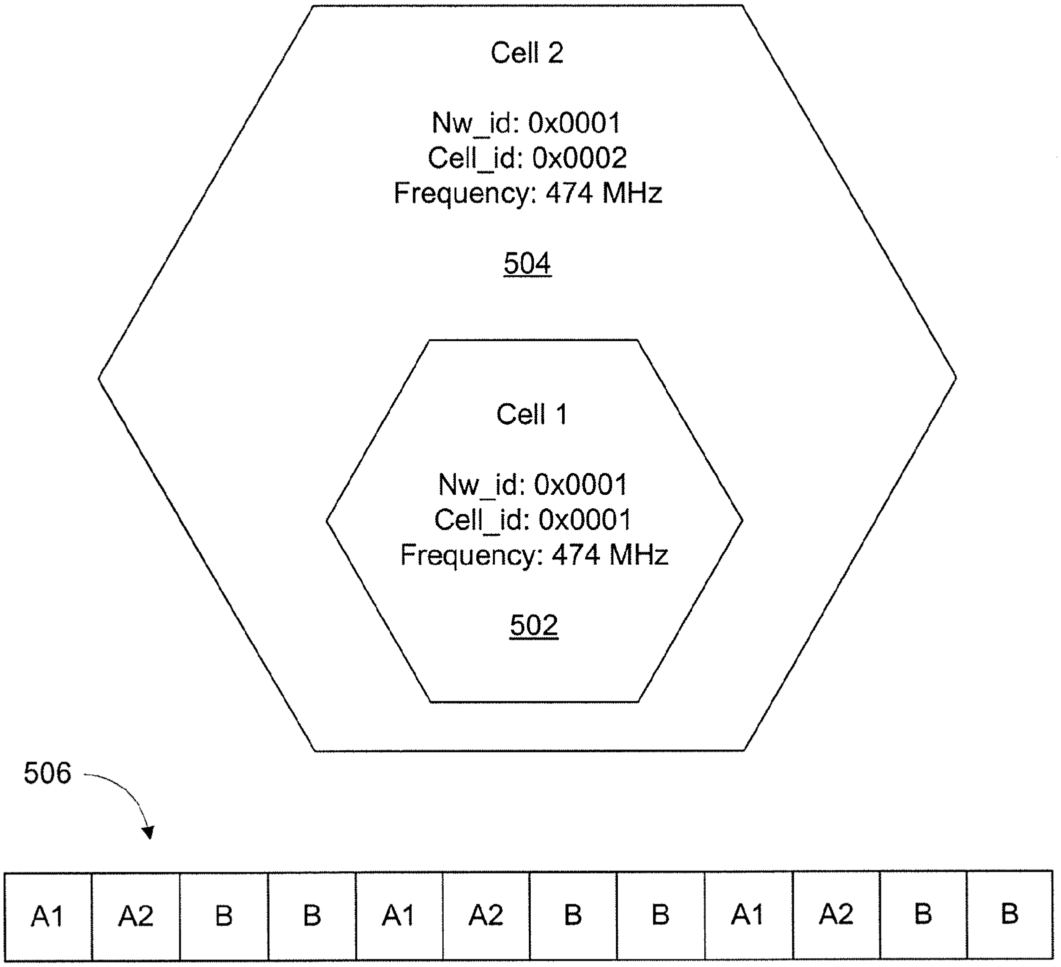
FIG. 5 illustrates hierarchical transmission of digital broadcast data as two separate cells in accordance with at least one embodiment.

FIG. 5 illustrates hierarchical transmission of digital broadcast data as two separate cells in accordance with at least one embodiment. In accordance with at least one embodiment, each hierarchical DVB-H stream (i.e., the HP stream and the LP stream) has its own separate dedicated "current signal" frame. This allows the streams to be independent of each other (even to belong to different networks). Furthermore, in accordance with the hierarchical signal arrangement, a cell can be uniquely identified by its network_id and cell_id. Since frequency is not an attribute of the "current signal" frame, the sub-cells can be considered to be transparent to the receiver. In other words, the receiver doesn't need to know whether a particular cell is a sub-cell of another cell.

FIG. 5 shows an example of how, for hierarchical transmission, the HP stream may be identified as Cell 1 504. The independent "current signal" parameters of Cell 1 (including cell_id and network_id) are provided (at an example frequency of 474 MHz) in the TPS stream 506 in "current signal" frame A1. Cell 2 502 (i.e., the LP stream) has its independent "current signal" parameters provided in "current signal" frame A2, which is separate from "current signal" frame A1, as shown in the TPS stream 506.

Each frame may contain any number (in one embodiment 68 bits) of TPS bits. The TPS bits of each frame may indicate the status of the frame. For example, a frame may contain a DVB-H indicator field that may indicate the type of frame with regard to the data carried in the frame. As one example, the type indicator field may indicate a frame of the current cell or a neighboring cell. Also, the type indicator field of the signaling frame may indicate if the cell is of the same network or different network from the current cell. Also, a frame may contain an optional synchronization word. In one example, a frame may contain a synchronization word of 16 bits. In addition, the frame may contain an optional initialization bit.

The fields within a frame may be of varying lengths and may provide any type of information pertinent to the signaling frame or data communication. Also, the fields may be in any order or at any location within the frame. Also, multi-bit fields may be divided into multiple parts within the frame such that a part of the field may be located at one portion of the frame whereas another part of the field may be located at a different portion of the frame. Each of the parts of the field may be separated by any number of other fields of any length.

The fields in a frame may provide any desired information. For example, a frame may contain a field for providing a network identification of the current network. The frame may also contain any other relevant information such as, but not limited to current cell identification, hierarchy, code rate, constellation parameter information, etc. Any of these fields may be of any length and may be arranged in any order. Also, as discussed above, any multibit field may be divided into parts with each part being located at any portion of the frame in any order.

In one example, a signaling frame may contain information on neighboring networks. This information may include, for example, a number of neighboring networks within the current cell's coverage area or the number of neighboring signals in the current network and total number of neighboring signals. In another example, a frame may contain a parameter for providing signals of neighboring cells within the same network as the current cell. For example, the parameters may include information on transmission frequency, cell identification, number of parameters related to the signals, guard interval, transmission mode, etc. for each neighboring signal. In another example, a frame may include signaling parameters for neighboring cells that are of different networks as compared to the current cell. As examples of the signaling parameters of this example, the parameters may include network identification, transmission frequency, cell identification, and/or number of parameters related to the signal (e.g., guard interval, transmission mode, and bandwidth).

Figure 6:
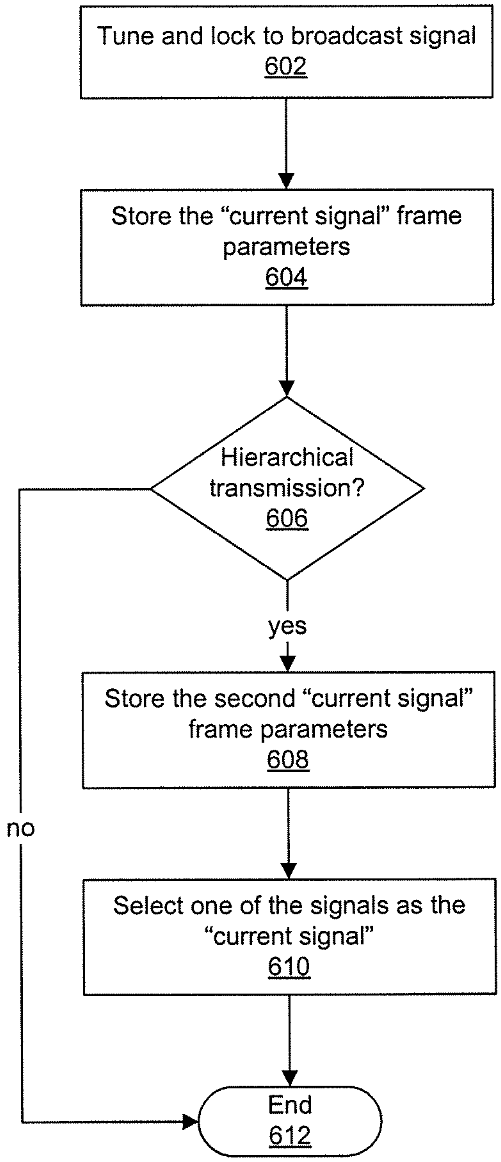
FIG. 6 shows steps of a method in accordance with at least one embodiment that a receiver may use to decode the "current signal" information in the case of hierarchical transmission.

FIG. 6 shows steps of a method, in accordance with at least one embodiment, that a receiver may use to decode the "current signal" information in the case of hierarchical transmission. The broadcast signal is tuned and locked, as shown at 602. Then "current signal" parameters are stored, as shown at 604. If the transmission is not hierarchical, then the "no" branch from 606 is followed and processing ends at 612. Otherwise, if transmission is hierarchical, then the "yes" branch from 606 is followed. The second "current signal" frame parameters are then stored, as shown at 608. One of the signals is then selected as the current signal, as shown at 610, since, in the hierarchical transmission, a receiver with single front-end is able to tune to one hierarchical signal at a time.

Figure 7A:
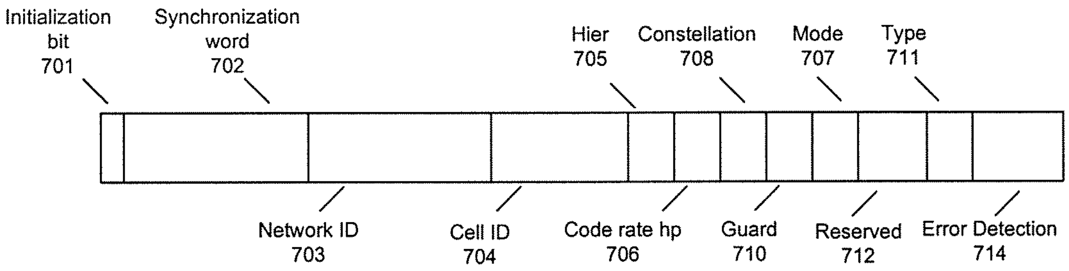
FIG. 7A illustrates one example of a signaling frame for indicating parameters of a current signal in accordance with at least one embodiment.
Figure 7B:
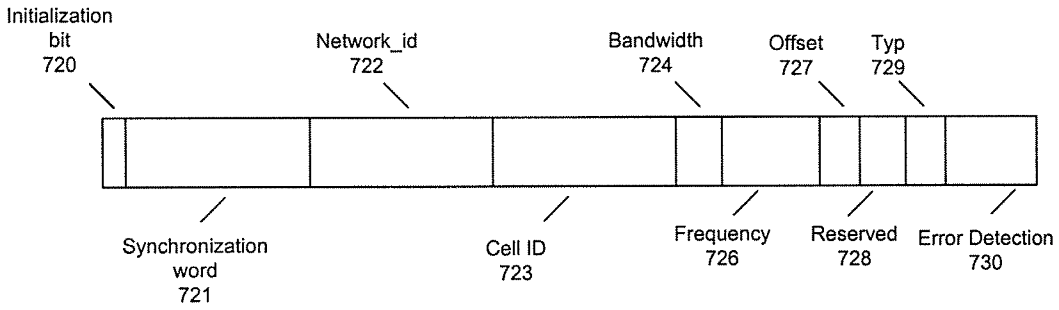
FIG. 7B illustrates an example of a signaling frame in which the signaling frame may indicate parameters for neighboring signals in accordance with at least one embodiment.

FIGS. 7A and 7B illustrate examples of signaling frames containing TPS bits. FIG. 7A illustrates one example of a signaling frame for indicating parameters of a current signal in accordance with at least one embodiment. In this example, a frame contains various fields for providing parameters of the signal such as an initialization bit 701, a synchronization word 702 (16 bits), a Network ID 703 (16 bits), Cell ID 704 (16 bits), Hierarchy information 705 (3 bits), Code Rate 706 (2 bits), Constellation 708 (2 bits), Guard Interval 710 (2 bits), Mode 707 (2 bits), a field reserved for future use 712 (3 bits), Type 711 (2 bits), and/or Error Detection 709 (4 bits). In the case of hierarchical transmission, the Code Rate field 706 it is the code rate of the HP or LP stream if the frame is HP or LP, respectively. Similarly, the constellation field 708 is the constellation of the HP or LP stream if the frame is HP or LP, respectively. The type field 711 may indicate that the parameters are for the current cell if the type field 711 contains a first value and that the parameters are of a neighboring cell if the type field 711 contains a second value. As one example, the type of frame is a current cell if the value of the type field 711 is "00", a neighboring cell in the same network if the type field 711 is "01", and values "10" and "11" may be reserved for future use. The Error Detection field 709 provides a means for detecting errors in a received TPS frame. As will be apparent, other suitable type-field values may also be used. And the fields shown in FIG. 7A may be of any suitable size (i.e., number of bits).

FIG. 7B illustrates an example of a signaling frame in which the signaling frame may indicate parameters for neighboring signals in accordance with at least one embodiment. In this example, a frame contains various fields for providing parameters of the signal such as an initialization bit 720, a synchronization word 721 (16 bits), a Network ID 722 (16 bits), Cell ID 723 (16 bits), Bandwidth 724 (2 bits), Frequency 726 (7 bits), Offset 727 (2 bits), a field reserved for future use 728 (3 bits), Type 729 (2 bits), and/or Error Detection 730 (4 bits). In this example, the type field 711 may indicate that the parameters are for a neighboring cell if the type field 711 contains a predefined value, such as "01", for example. The field Offset 727 is used for signaling the offset of the signal center frequency from the channel center frequency. As will be apparent, other suitable type-field values may also be used. And the fields shown in FIG. 7B may be of any suitable size (i.e., number of bits).

Figure 8:
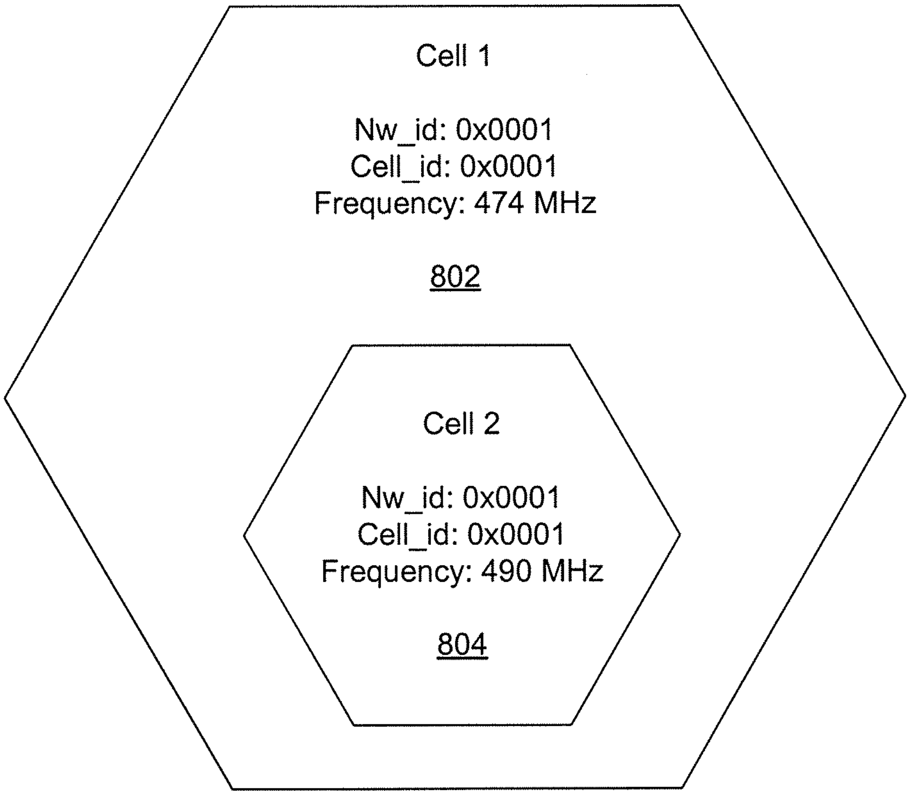
FIG. 8 illustrates two cells that have common network ID's and Cell ID's, but have different frequencies in accordance with at least one embodiment.

FIG. 8 illustrates two cells that have common network ID's and Cell ID's, but have different channel center frequencies in accordance with at least one embodiment. As shown in FIG. 8, the channel center frequency of Cell 1 802 is 474 MHz, and the channel center frequency of Cell 2 804 is 490 MHz. Using the frequency as an additional identifier, besides the already existing network_id and cell_id, a receiver in accordance with at least one embodiment may recognize cells that are uniquely identified with network_id, cell_id, and frequency. The example in FIG. 8 illustrates a network arrangement that includes a sub-cell. The mother cell, Cell 1, is transposed to the sub-cell, Cell 2. The receiver may uniquely identify Cell 2, for handover purposes, for example, by using a process of the type shown in FIG. 9.

Figure 9:
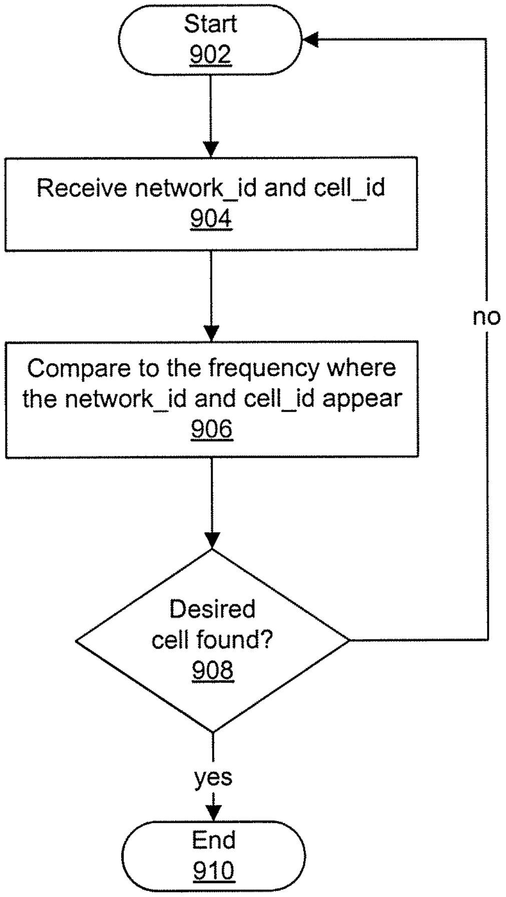
FIG. 9 is a flowchart illustrating an example of a method, performed by a receiver, of detecting unique cells in accordance with at least one embodiment.

FIG. 9 is a flowchart illustrating an example of a method, performed by a receiver, of detecting unique cells in accordance with at least one embodiment. The process begins at 902 and proceeds to 904, where network_id and cell_id are received. The hierarchical signals (i.e., the HP stream and the LP stream) share a common frequency with different modulation parameters. So, a comparison is made to the frequency where the network_id and cell_id appear, as shown at 906. This comparison is performed to determine which hierarchical signal has a desired cell_id and a desired network_id. If the desired cell is not found, then the "no" branch is followed from 908 to the start 902. Otherwise, if the desired cell is found, then the "yes" branch is followed to 910 where the process ends.

In accordance with at least one embodiment of the invention, support for hierarchical transmission and identification of hierarchical streams (i.e., a high priority stream and a low priority stream) as separate cells is made possible. As such, implementation is simplified because the priority parameter is rendered unnecessary.

The capacity of the TPS stream of a digital broadcast system in accordance with one or more embodiments is reduced due to the adding of another "current signal" frame (A) in the case of hierarchical transmission, while transmissions not using hierarchical mode are not affected.

Support for transposed streams in accordance with at least one embodiment is made possible in signaling. There is no need for sub-cell identifier parameter, which saves memory and simplifies system implementation. Cost savings in a network are then possible due to the usage of sub-cells.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims. For example, in single frequency networks, cell_id and network_id could be signaled for each cell since the network has only a single frequency. The frames in OSI layer 1 may include cell_id and network_id for each signal (current and neighboring). The mapping of cell_id and service_id could be done in OSI Layer 2.

We claim:

1. An apparatus, comprising:

a processor; and a memory storing computer readable instructions that, when executed, cause the apparatus to at least:

receive transmission parameter signal data including a plurality of current signal frames, each current signal frame of the plurality of current signal frames providing parameters for a cell and including a cell identifier for the cell and a network identifier for the cell;

read a first current signal frame from the received transmission parameter signal data, the first current signal frame providing parameters for a first hierarchical transmission cell;

determine that a digital broadcast signal is a hierarchical transmission; and in response to determining that the digital broadcast signal is a hierarchical transmission, read a second current signal frame from the received transmission parameter signal data, the second current signal frame providing parameters for a second hierarchical transmission cell that is different than the first hierarchical transmission cell.

2. The apparatus of claim 1, wherein the transmission parameter signal data is signaled in OSI layer 1.

3. The apparatus of claim 1, wherein the digital broadcast signal is a Digital Video Broadcast for Handhelds (DVB-H) signal.

4. The apparatus of claim 1, wherein the first current signal frame includes a first network identifier and a first cell identifier that together uniquely identify the first hierarchical transmission cell, and the second current signal frame includes a second network identifier and a second cell identifier that together uniquely identify the second hierarchical transmission cell.

5. The apparatus of claim 1, wherein the first current signal frame is for a first frequency and the second current signal frame is for a second frequency that is the same as the first frequency.

6. The apparatus of claim 5, wherein the first current signal frame is for a high priority stream and the second current signal frame is for a low priority stream.

7. The apparatus of claim 1, wherein the first current signal frame includes a first network identifier, a first cell identifier, and a first frequency that together uniquely identify the first hierarchical transmission cell, and the second current signal frame includes a second network identifier, a second cell identifier, and a second frequency that together uniquely identify the second hierarchical transmission cell.

8. The apparatus of claim 1, wherein at least a portion of the digital broadcast signal is transposed such that the second current signal frame is for a frequency that is different than a frequency for the first current signal frame.

9. The apparatus of claim 1, wherein the second hierarchical transmission cell is a sub-cell of the first hierarchical transmission cell.

10. A method comprising:

receiving, at a computing device, transmission parameter signal data including a plurality of current signal frames, each current signal frame of the plurality of current signal frames providing parameters for a cell and including a cell identifier for the cell and a network identifier for the cell;

reading, at the computing device, a first current signal frame from the received transmission parameter signal data, the first current signal frame providing parameters for a first hierarchical transmission cell;

determining that a digital broadcast signal is a hierarchical transmission; and in response to determining that the digital broadcast signal is a hierarchical transmission, reading a second current signal frame from the transmission parameter signal data, the second current signal frame providing parameters for a second hierarchical transmission cell that is different than the first hierarchical transmission cell.

11. The method of claim 10, wherein the transmission parameter signal data is signaled in OSI layer 1.

12. The method of claim 10, wherein the digital broadcast signal is a Digital Video Broadcast for Handhelds (DVB-H) signal.

13. The method of claim 10, wherein the first current signal frame includes a first network identifier and a first cell identifier that together uniquely identify the first hierarchical transmission cell, and the second current signal frame includes a second network identifier and a second cell identifier that together uniquely identify the second hierarchical transmission cell.

14. The method of claim 10, wherein the first current signal frame is for a first frequency and the second current signal frame is for a second frequency that is the same as the first frequency.

15. The method of claim 14, wherein the first current signal frame is for a high priority stream and the second current signal frame is for a low priority stream.

16. The method of claim 10, wherein the first current signal frame includes a first network identifier, a first cell identifier, and a first frequency that together uniquely identify the first hierarchical transmission cell, and the second current signal frame includes a second network identifier, a second cell identifier, and a second frequency that together uniquely identify the second hierarchical transmission cell.

17. The method of claim 10, wherein at least a portion of the digital broadcast signal is transposed such that the second current signal frame is for a frequency that is different than a frequency for the first current signal frame.

18. The method of claim 10, wherein the second hierarchical transmission cell is a sub-cell of the first hierarchical transmission cell.

19. A non-transitory computer readable medium storing computer executable instructions, that when executed, cause an apparatus to:

receive transmission parameter signal data including a plurality of current signal frames, each current signal frame of the plurality of current signal frames providing parameters for a cell and including a cell identifier for the cell and a network identifier for the cell;

read a first current signal frame from the received transmission parameter signal data, the first current signal frame providing parameters for a first hierarchical transmission cell;

determine that a digital broadcast signal is a hierarchical transmission; and in response to determining that the digital broadcast signal is a hierarchical transmission, read a second current signal frame from the received transmission parameter signal data, the second current signal frame providing parameters for a second hierarchical transmission cell that is different than the first hierarchical transmission cell.

20. The non-transitory computer readable medium of claim 19, wherein the transmission parameter signal data is signaled in a physical layer of a communication protocol.

21. The non-transitory computer readable medium of claim 19, wherein the digital broadcast signal is a Digital Video Broadcast for Handhelds (DVB-H) signal.

22. The non-transitory computer readable medium of claim 19, wherein the first current signal frame includes a first network identifier and a first cell identifier that together uniquely identify the first hierarchical transmission cell, and the second current signal frame includes a second network identifier and a second cell identifier that together uniquely identify the second hierarchical transmission cell.

23. The non-transitory computer readable medium of claim 19, wherein the first current signal frame is for a first frequency and the second current signal frame is for a second frequency that is the same as the first frequency.

24. The non-transitory computer readable medium of claim 23, wherein the first current signal frame is for a high priority stream and the second current signal frame is for a low priority stream.

25. The non-transitory computer readable medium of claim 19, wherein the first current signal frame includes a first network identifier, a first cell identifier, and a first frequency that together uniquely identify the first hierarchical transmission cell, and the second current signal frame includes a second network identifier, a second cell identifier, and a second frequency that together uniquely identify the second hierarchical transmission cell.

26. The non-transitory computer readable medium of claim 19, wherein at least a portion of the digital broadcast signal is transposed such that the second current signal frame is for a frequency that is different than a frequency for the first current signal frame.

27. The non-transitory computer readable medium of claim 19, wherein the second hierarchical transmission cell is a sub-cell of the first hierarchical transmission cell.

28. A method comprising:

receiving, at a computing device, a plurality of current signal frames from a transmission parameter signaling data stream supporting both hierarchical transmissions and non-hierarchical transmissions;

identifying, at the computing device, a first current signal frame of the plurality of current signal frames, the first current signal frame providing parameters for a first hierarchical transmission cell, and including a first cell identifier for the first hierarchical transmission cell and a first network identifier for the first hierarchical transmission cell;

identifying a second current signal frame of the plurality of current signal frames, the second current signal frame belonging to the hierarchical transmission, providing parameters for a second hierarchical transmission cell that is different than the first hierarchical transmission cell, and including a second cell identifier for the second hierarchical transmission cell and a second network identifier for the second hierarchical transmission cell;

determining that a first digital broadcast signal is a hierarchical transmission;

upon determining that the first digital broadcast signal is a hierarchical transmission, selecting a first current signal based on the first current signal frame and the second current signal frame, and receiving data over the first current signal;

identifying a third current signal frame of the plurality of current signal frames;

determining that a second digital broadcast signal is a non-hierarchical transmission; and upon determining that the second digital broadcast signal is a non-hierarchical transmission, identifying a second current signal based on the third current signal frame and receiving data over the second current signal.

29. The method of claim 28, wherein the first current signal frame and the second current signal frame are signaled in OSI layer 1.

30. The method of claim 28, wherein the first current signal is a first Digital Video Broadcast for Handhelds (DVB-H) signal.

31. The method of claim 28, wherein the first network identifier and the first cell identifier together uniquely identify the first hierarchical transmission cell, and the second network identifier and the second cell identifier together uniquely identify the second hierarchical transmission cell.

32. The method of claim 28, wherein the first current signal frame is for a first frequency and the second current signal frame is for a second frequency that is the same as the first frequency.

33. The method of claim 28, wherein the first current signal frame is for a high priority stream and the second current signal frame is for a low priority stream.

34. The method of claim 28, wherein the first current signal frame further includes a first frequency, and the second current signal frame further includes a second frequency, wherein the first network identifier, the first cell identifier and first frequency together uniquely identify the first hierarchical transmission cell and the second network identifier, the second cell identifier and second frequency together uniquely identify the second hierarchical transmission cell.

35. The method of claim 28, wherein a frequency of the second current signal is different than a frequency of the first current signal.

* * * * *